Figure 2:
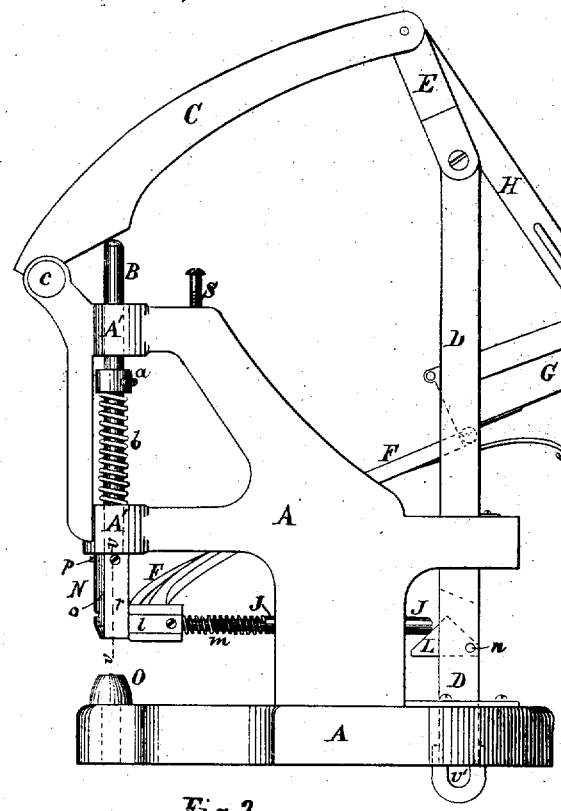

2 Sheets—Sheet 1.

M. BRAY.

Assignor to the TUBULAR RIVET CO.

Rivet-Setting Machine.

No. 8,276. Reissued June 11, 1878.

Witnesses:
C. A. Hemmenway.
C. H. Dodd.

Inventor:
Mellen Bray
By N. C. Lombard
Attorney.

THE NORRIS PETERS CO., PHOTO-LITHO., WASHINGTON, D. C.

M. BRAY.

Assignor to the TUBULAR RIVET Co.

Rivet-Setting Machine.

No. 8,276. Reissued June 11, 1878.

Witnesses:
E. A. Hemmenway.
C. H. Dodd.

Inventor:
Mellen Bray
By N. G. Lombard
Attorney.

THE NORRIS PETERS CO., PHOTO-LITHO., WASHINGTON, D. C.

UNITED STATES PATENT OFFICE.

MELLEN BRAY, OF NEWTON, MASSACHUSETTS, ASSIGNOR TO THE TUBULAR RIVET COMPANY, OF CONNECTICUT.

IMPROVEMENT IN RIVET-SETTING MACHINES.

Specification forming part of Letters Patent No. 161,659, dated April 6, 1875; Reissue No. 8,276, dated June 11, 1878; application filed May 27, 1878.

*To all whom it may concern:*

Be it known that I, MELLEN BRAY, of Newton, in the county of Middlesex and State of Massachusetts, have invented certain new and useful Improvements in Rivet-Setting Machines, of which the following, taken in connection with the accompanying drawings, is a specification:

My invention relates to a machine for setting tubular rivets in leather, cloth, paper, or other thin flexible material, and is designed to separate the rivets, feed them to the setting-tools in proper position, and force them through the material, (the rivet cutting its own way through the material, as described in Letters Patent No. 157,116, granted to me November 24, 1874,) and turning over the tubular end of the rivet onto the material to form a second head upon the opposite side of the material; and it consists, first, in the use, in combination with setting-tools, of a hopper, into which the rivets are placed in bulk, pivoted at one end to the upper end of an inclined chute, and arranged to be vibrated about said pivots in such a manner that its bottom may alternately incline in opposite directions toward or from said pivoted end, and thus cause the rivets contained therein to move back and forth in said hopper until more or less of them fall into an opening formed in the bottom of said hopper, said opening being just wide enough to allow the free passage of the body of the rivet, but not wide enough to allow the head to pass, and extending along the center of the hopper-bottom, in line with the groove or slit in the inclined chute, and so arranged as to match the groove in the chute when the hopper is inclined toward the chute, so that the rivets which have fallen into said opening may be transferred to the chute by simply sliding down the incline, a suitable opening being formed in the end of the hopper toward the chute, to allow the heads of the rivets to pass.

It further consists in constructing said hopper with that portion of its bottom farthest from the pivoted end at an angle to the other portion, and limiting the slot in the bottom to that portion of the hopper next to the inclined chute, for the purpose of retarding the rivets that are rolling or sliding about in the hopper, in their descent toward the chute, until those rivets which have fallen into the slot have slid down and passed out of the hopper into the chute.

It has been found by trial that with a straight-bottomed hopper the rivets that have fallen into the slot will not arrive at the bottom or lower end of the hopper as soon as those rivets that are not thus arranged in order, and the result of this is that very often the passage of the arranged rivets from the hopper into the chute is prevented by a rivet falling into the slot crosswise in front of the line of rivets descending the slot on their way to the chute; hence the necessity for this part of my improvement.

My invention further consists in making said hopper in two parts, hinged together, so that the angle of the two portions of the bottom may be varied at will.

My invention further consists in the use, in combination with setting-tools, of a receiver for holding the rivet in position to be acted upon by the setting-tools, said receiver being located between the anvil and the movable setting-plunger, above the work to be riveted, and so connected with said movable plunger as to move downward with said plunger during the first part of its downward motion, and then remain in a state of rest till said plunger has forced the rivet out of said receiver and into the material, or mounted upon a spring surrounding the stationary setting-anvil below the work, and made to yield by the blow of the setting-plunger, as will be described.

My invention further consists in the employment of an inclined cam or wedge pivoted to the operating-bar in proper position to act upon the plunger for moving a rivet from the lower end of the inclined chute into the receiver, said wedge being so arranged as to move said plunger when the operating-bar is moving upward, and to fold up into a slot in said bar while passing the plunger in its downward stroke.

It further consists in the combination, with an inclined chute and a rivet-receiver mounted upon the setting-plunger or clinching-anvil, of a guide-channel cutting across the lower end of said chute at right angles thereto, and provided with a spring side to hold the rivets in place and a plunger to move the lower rivet in the chute into the receiver.

It further consists in making the clinching-anvil of a goose-neck form to facilitate the setting of rivets through two or more thicknesses of material without injury to another thickness, which might otherwise be pierced by the rivet.

Figure 8:
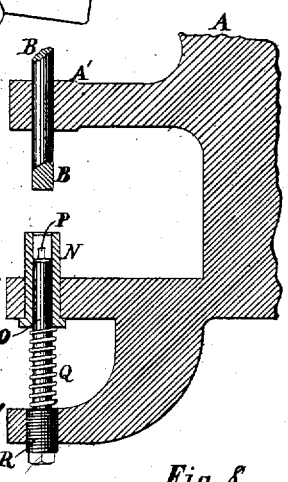
Figure 1:
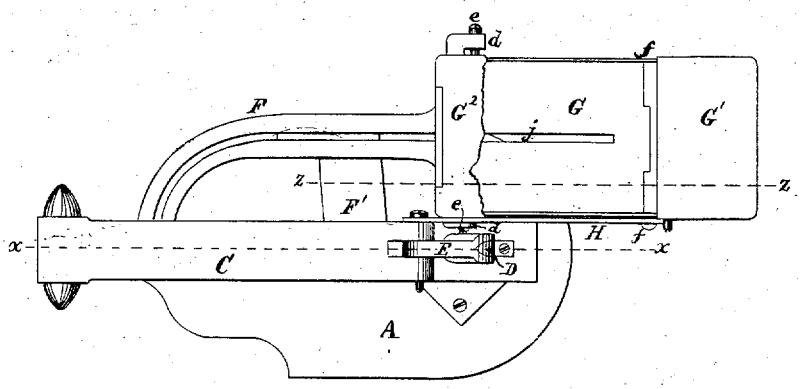
Figure 3:
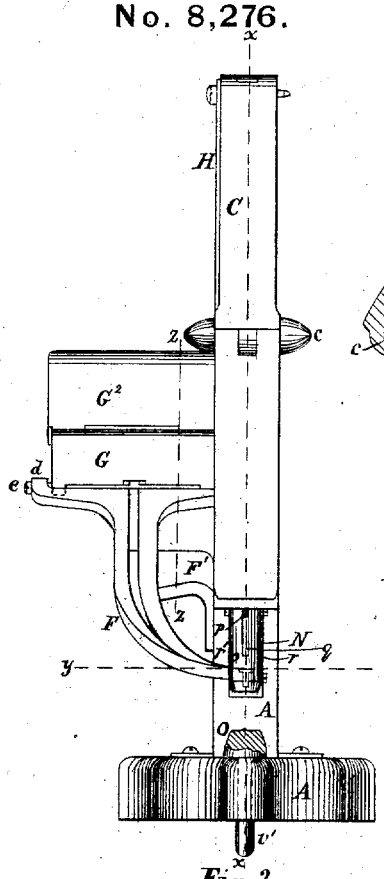
Figure 4:
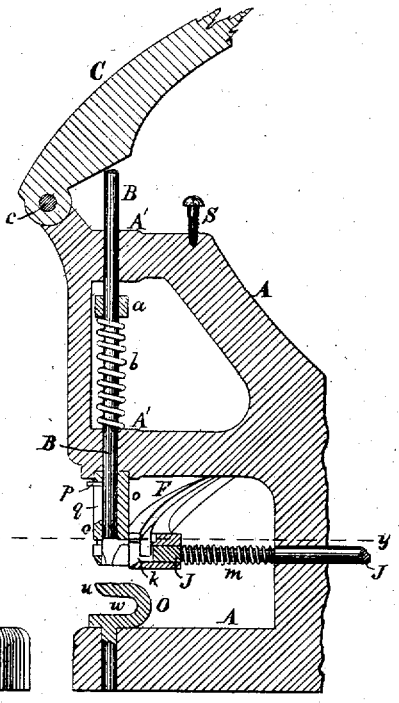
Figure 7:
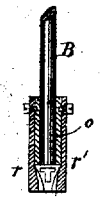
Figure 5:
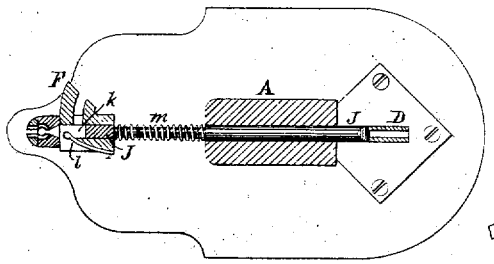
Figure 6:
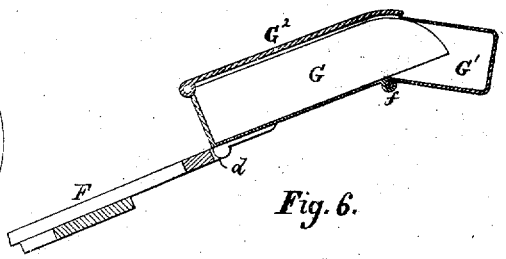

Figure 1 of the drawings is a plan of my improved rivet-setting machine. Fig. 2 is a side elevation. Fig. 3 is a front elevation. Fig. 4 is a vertical section on line *x x* on Figs. 1 and 3. Fig. 5 is a horizontal section on line *y y* on Figs. 3 and 4. Fig. 6 is a section of the hopper on line *z z* on Figs. 1 and 3. Fig. 7 is a vertical section of the receiver on line *v v* on Fig. 2; and Fig. 8 shows a modification of the receiver and setting-tools.

A is the frame of the machine, carrying in bearings A′ A′ the setting-plunger B, provided with the collar *a*, between which and the lower bearing A′ it is surrounded by the spiral spring *b*, which tends to move said plunger upward. A downward motion is imparted to the plunger B by means of the lever C hinged or pivoted to the frame A at *c*, said lever being drawn downward by the operating-bar D, to which it is connected by the link E.

F is a curved inclined chute, secured to the frame A by the foot F′, and having its upper end T-shaped, and provided with ears *d d*, in which are screw-pivots *e e*, upon which is mounted the hopper G G¹ at or near one end. The hopper is made in two parts, G and G¹, hinged together at *f*, the part G¹ being adjustable about the hinge *f* by means of the screw *g* and slot *h* for the purpose of varying the angle of the bottom of the portion G¹ to the bottom of the portion G.

The hopper G G¹ is made to vibrate about the pivots *e e* by means of the link H, connected at its upper end to the lever C, and at its lower end to the hopper at the point *f*. The link H is provided with the slot *i*, through which the pin which connects it to the hopper passes, for the purpose of allowing the completion of the motion of the lever C and operating-bar D after the downward motion of the hopper has been stopped by its coming in contact with the stop-spring I.

The hopper G G¹ is also provided with the cover G², to prevent the rivets from being thrown out of the hopper during its vibrations, and also with the slot *j*, to receive the rivets and guide them to the chute F, in an obvious manner.

The lower end of the chute F terminates in a horizontal groove or guide-channel, *k*, at right angles thereto, in which the plunger J is arranged to reciprocate, for the purpose of cutting off from the line of rivets descending the chute the lower rivet, and moving it into position to be acted upon by the setting-tools.

The outer wall of the channel *k*, opposite the end of the chute, is cut away, and its place supplied by the spring *l* extending nearly across said channel diagonally, the purpose of which is to prevent the lower rivet from being accidentally displaced, so as to allow two rivets to get into the channel *k* in front of the plunger J at the same time.

The plunger J is moved in one direction by the spring *m* and in the opposite direction by the wedge-cam L pivoted at *n* to the operating-bar D, and arranged to fold up into a slot in said bar while passing said plunger in its downward movement, and to be held firmly in the position shown in Fig. 2 while the operating-bar D is moving upward.

To the lower end of the setting-plunger B is attached the rivet-receiver N, consisting of a tubular thimble, *o*, fitted loosely to said plunger and held in position thereon by the pin *p* set in said plunger and projecting outward into the slot *q* formed in said thimble, and the side springs *r* and *r′*, the lower ends of which are shaped as shown in Figs. 5 and 7, their cross-section being such as to present toward the rivet approaching the receiver a flaring opening, into which the rivet is forced by the plunger J, causing said springs to open and allow the rivet to pass to its position in line with the setting-tools, when the springs will close upon the body of the rivet and hold it in a perpendicular position under the plunger J.

O is the clinching-anvil, set in the base of the frame A, a modification of which, adapted to special work, is shown at O *u* in Fig. 4.

The operation of my improved machine is as follows: The work to be riveted is placed on the anvil O, the chute F having been previously filled or partly with rivets, when the operator places his foot upon a treadle (not shown in the drawings) connected at *v* with the operating-bar D, and, depressing the same, the bar D, lever C, and hopper G G¹ are all moved downward, and the action of the lever C upon the plunger B forces it downward, carrying with it the receiver N and a rivet contained therein until said receiver rests upon the work to be riveted, when the receiver remains stationary, while the plunger continues to move downward, forcing the rivet out of the springs *r* and *r′* and through the material, (the rivet cutting its own path,) and clinching it upon the under side of the material by spreading the tube and turning it over onto the material, the core cut from the material being forced into the hollow of the rivet and retained therein.

When the operator's foot is removed from the treadle, the treadle and operating-bar D will be moved upward, carrying with said bar the lever C and the hopper G G¹, and allowing the plunger B and receiver N to be moved upward by the spring *b*. The upward movement of the bar D carrying the wedge-cam L past the end of the plunger J causes said plunger to be moved toward the receiver N, and feeding the lower rivet, in the line descending the chute, into the receiver N, ready to be set by the next downward motion of the plunger B.

If it is desired to rivet together two pieces of leather or other material with a third piece stretched across the others without injury to the third piece—as, for instance, for the purpose of securing a loop to a strap, as in harness-work—the form of anvil shown in Fig. 4 is used, the parts to be riveted being placed on the upper side, in the usual way, with the loop in the slit *w* under the part *u* of the anvil, by which means the rivet may be set as firmly as in plain work without any injury whatever to the loop.

For some classes of work it is desirable to have the rivet enter the work from the under side, in which case I construct the setting-tools and receiver as shown in Fig. 8, in which the receiver N is a simple tube surrounding the upper end of the stationary anvil O, and projecting above the upper end of the same a distance equal to the length of the longest rivet to be set, so as to form a pocket, into which the rivet P may be fed automatically with its head downward, as shown, by mechanism substantially as described above for feeding the rivet into the receiver when attached to the moving plunger above the work, or into which the rivet may be placed by hand, said receiver resting upon the spring Q, as shown.

The anvil-rod O may be adjusted by means of the screw R, formed on its lower end, working in the threaded stand R′, secured to the under side of the frame A.

In this modification the clinching-die is formed on the lower end of the moving plunger B instead of upon the upper face of the stationary anvil, as shown in the other figures of the drawings.

S is an adjustable stop to limit the motion of the lever C in a downward direction, and prevent the rivet-head from being forced through the material by too great a pressure.

What I claim as new, and desire to secure by Letters Patent of the United States, is as follows:

1. In combination with setting-tools and an inclined chute for conveying the rivets thereto, a hopper provided with a slot in its bottom, of suitable width to receive the body of the rivet, and an opening through one end for the passage of the head of the rivet, with the hopper pivoted at one end to the upper end of the chute, and adapted to be vibrated around the pivots, substantially as described, for the purposes specified.

2. A hopper for receiving, separating and arranging rivets, pivoted and slotted, as described, having that portion of its bottom farthest from its pivoted end and beyond the end of the slot made at an angle to the other portion, substantially as and for the purpose set forth.

3. The hopper G G¹, made in two parts, hinged together, and adapted for adjustment at different angles relative to each other, substantially as described.

4. In combination with a hopper, an inclined chute leading therefrom, and a plunger for moving the lower rivet in the chute to the setting-tools, the pivoted wedge-cam L, operating-bar D, and spring *m*, all arranged and adapted to operate substantially as described.

5. The combination of the chute F, guide-channel *k*, provided with the spring *l*, the plunger J, and receiver N, adapted to operate substantially as described, whether said receiver is mounted upon the setting-plunger or the anvil.

6. The receiver N, adapted to hold the rivet in position to be acted upon by the setting-tools and to move vertically or in line with the movement of the setting-plunger, for the purpose of guiding the rivet to the work, substantially as described.

7. In combination with a reciprocating plunger and a clinching-anvil, a receiver provided with spring or yielding sides, and adapted to receive the rivet and hold it in a perpendicular position between the plunger and anvil, and to be moved vertically or in line with the movement of the plunger during the first part of the downward movement of said plunger and guide the rivet to the work, and then remain in a state of rest till the plunger has completed its downward motion and forced the rivet from the receiver into the material, substantially as described.

8. The receiver N, provided with the springs *r* and *r′*, mounted upon the setting-plunger B, and adapted to operate substantially as described.

9. The combination of the receiver N, setting-plunger B, and special anvil O *u*, provided with the slit *w*, all arranged to operate as and for the purposes described.

Executed at Boston, Massachusetts, this 22d day of May, A. D. 1878.

MELLEN BRAY.

Witnesses:

N. C. LOMBARD,

E. A. HEMMENWAY.